(12) United States Patent
Thomas (10) Patent No.: US 11,326,718 B1
(45) Date of Patent: May 10, 2022

(54) POST IN COMBINATION WITH A LINE CONNECTOR

(71) Applicant: NZ Tube Mills Limited, Lower hutt (NZ)

(72) Inventor: Malcolm Thomas, Upper Hutt (NZ)

(73) Assignee: NZ Tube Mills Limited

( * ) Notice: Subject to any disclaimer, the term of this patent is extended or adjusted under 35 U.S.C. 154(b) by 0 days.

(21) Appl. No.: 17/217,934

(22) Filed: Mar. 30, 2021

(51) Int. Cl.
   *F16L 3/13* (2006.01)
   *E04H 17/12* (2006.01)
   *E04H 17/10* (2006.01)
   *A01G 17/06* (2006.01)

(52) U.S. Cl.
   CPC ............... *F16L 3/13* (2013.01); *A01G 17/06* (2013.01); *E04H 17/12* (2013.01); *E04H 17/124* (2021.01)

(58) Field of Classification Search
   CPC .... F16L 3/13; F16L 5/00; E04H 17/10; E04H 17/12; E04H 17/124; A01G 17/06; A01G 17/04; A01G 17/14; A01G 17/08; A01G 17/10
   USPC ............... 248/72, 219.2, 218.4, 74.2, 230.7; 256/47, 54, 57; 174/158 F, 163 F
   See application file for complete search history.

(56) References Cited

U.S. PATENT DOCUMENTS

| | | | | |
|---|---|---|---|---|
| 507,966 A | * | 10/1893 | Bradford | ............ E04H 17/10 256/48 |
| 3,259,347 A | * | 7/1966 | Yates | ............ F16L 3/13 248/73 |
| 3,654,383 A | * | 4/1972 | Wilson | ............ H01B 17/145 174/163 F |
| 4,982,932 A | * | 1/1991 | Baker | ............ E04H 17/12 256/48 |
| 5,085,409 A | * | 2/1992 | Teixeira | ............ E04H 17/12 256/48 |
| 2002/0046982 A1 | * | 4/2002 | Guizzardi | ............ A47B 57/545 211/187 |
| 2005/0211968 A1 | | 9/2005 | Egan | |
| 2019/0368221 A1 | | 12/2019 | Stager | |

FOREIGN PATENT DOCUMENTS

| | | |
|---|---|---|
| AU | 2003100651 A4 | 10/2003 |
| EP | 0428468 A1 | 5/1991 |
| WO | WO 2018172631 A1 | 9/2018 |

OTHER PUBLICATIONS

Australia Examination Report for 2020202080 dated Feb. 5, 2021, and related documents.

* cited by examiner

*Primary Examiner* — Christopher Garft
(74) *Attorney, Agent, or Firm* — Gloria Tsui-Yip, Esq.; Gottlieb, Rackman & Reisman, P.C.

(57) ABSTRACT

A post in combination with a line connector for holding a line in an elevated disposition for supporting vines. The line connector has an arcuate body, an opening into the body, resilient connective edges, a recess, and a line clip. The upper part of the post is within the opening of the line connector. The resilient connective edges of the line connector hold the line connector securely against the post. The line is held by the recess and line clip of the line connector.

8 Claims, 8 Drawing Sheets

POST IN COMBINATION WITH A LINE CONNECTOR

FIELD OF INVENTION

A preferred form of the invention relates to a post in combination with a line connector for holding a line in an elevated disposition for supporting vines.

BACKGROUND

It is known to install a row of posts having lines, for example wires, held in an elevated fashion. The wires are used for supporting vines as they grow. A problem in some vineyards or the like is that it can be difficult to prune vines growing horizontally along the wires, in particular where it is impractical to remove the wires from the posts. It is an object of a preferred form of the invention to go at least some way towards addressing this problem. While this applies to the preferred embodiment, it should be understood that the object of the invention per se is simply to provide the public with a useful choice. Therefore object of the preferred embodiment should not be seen as a limitation on any claims expressed more broadly.

Definitions

The term "comprising" if and when used in this document in relation to a combination of features does not rule out the option of there being further unnamed features. The term is therefore inclusive, not exclusive.

References to orientational terms, for example "top" and "bottom", refer to a feature when in a normal in-use disposition, unless otherwise indicated.

SUMMARY OF THE INVENTION

A post in combination with a line connector, the connector having an arcuate body, an opening into the body, resilient connective edges and line holder means, the combination being such that:
  an upper part of the post is within the opening;
  the resilience of the edges assist in holding the connector securely against the post; and
  a line is engaged by the line holder means and held in an elevated disposition.

Optionally the line holder means comprises a recess in the connector in combination with a line clip.

Optionally the clip has a pair of fixing legs that are held in the arcuate body by way of their resilience.

Optionally the fixing legs of the clip engage an aperture adjacent to the recess.

Optionally the clip has a pair of resilient line engaging arms.

Optionally the line passes through both the recess in the arcuate body and the line engaging arms.

Optionally the connector has two resilient connective edges, each edge having a tab which extends, or is adapted to extend, into the opening for engagement with a complimentary slot on each side of the post.

Optionally the connector has at least one tab which extends into a complimentary slot in the side of the post to facilitate securement of the connector to the post.

Optionally the connector has at least two tabs each of which extends into a respective complimentary slot in the side of the post to facilitate securement of the connector to the post.

A line connector for use in engaging a line with a post, the connector comprising:
  an arcuate body having:
    an opening into the body for receiving a post;
    resilient connective edges;
    an upwardly-opening line receiving recess; and
    a clip receiving aperture below the recess; and
  a clip that:
    has resilient fixing legs adapted to securely engage in the clip receiving aperture by way of their resilience; and
    has resilient line engaging arms that are aligned, or adapted to align, with the recess of the arcuate body such that a line can pass through the recess and between the arms while being held by the resilience of those arms.

Optionally the connective edges of the arcuate body each have a tab which extends, or is adapted to end, into the opening for engagement with complimentary apertures in a post.

Optionally the fixing legs extend substantially at right angles with respect to the line engaging arms.

BRIEF DESCRIPTION OF THE DRAWINGS

Some preferred embodiments of the invention will now be described by way of example and with reference to the accompanying drawings, of which.

DETAILED DESCRIPTION

Figure 1:
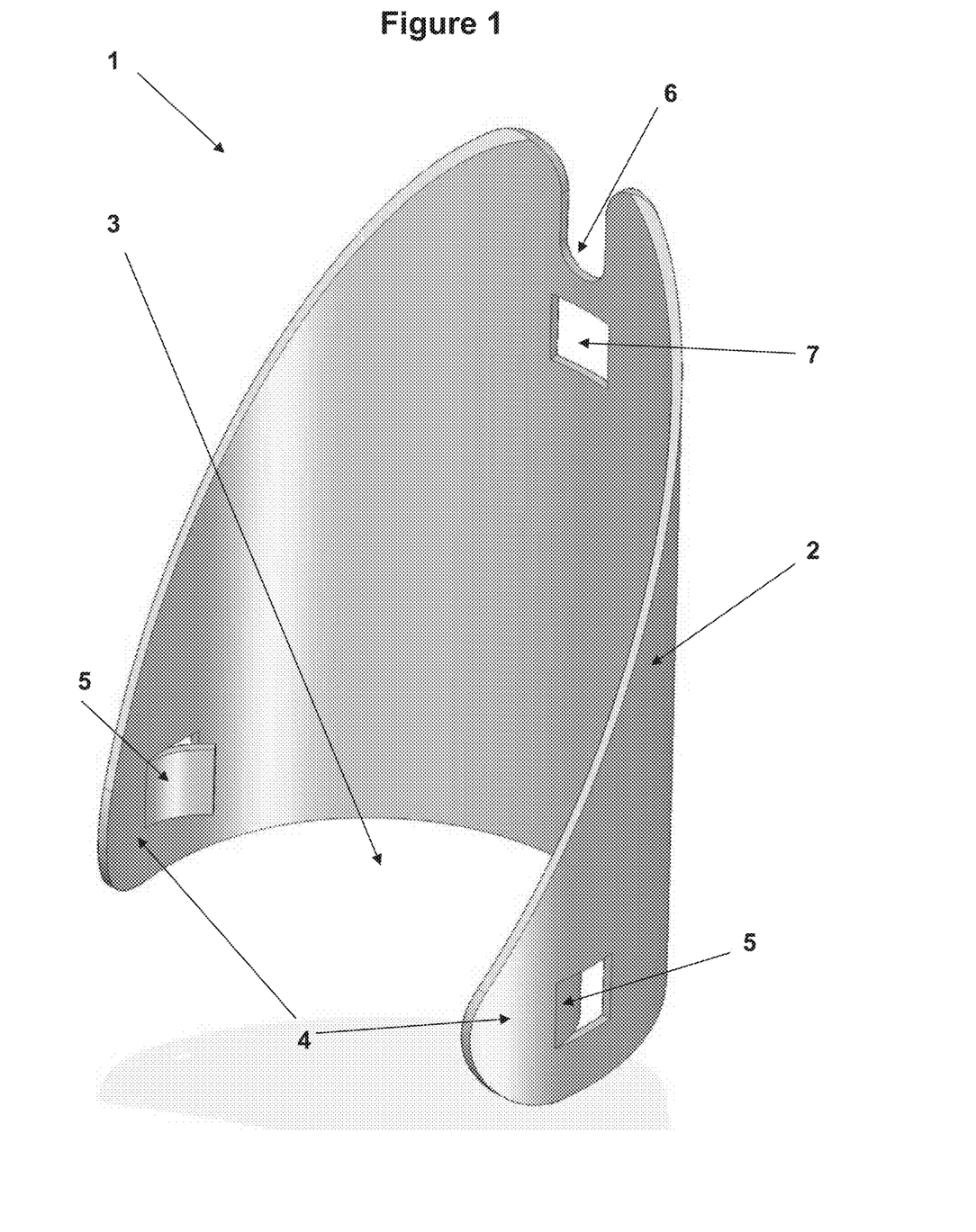
FIG. 1 is an isometric view of a cap that forms part of a line connector.
Figure 2:
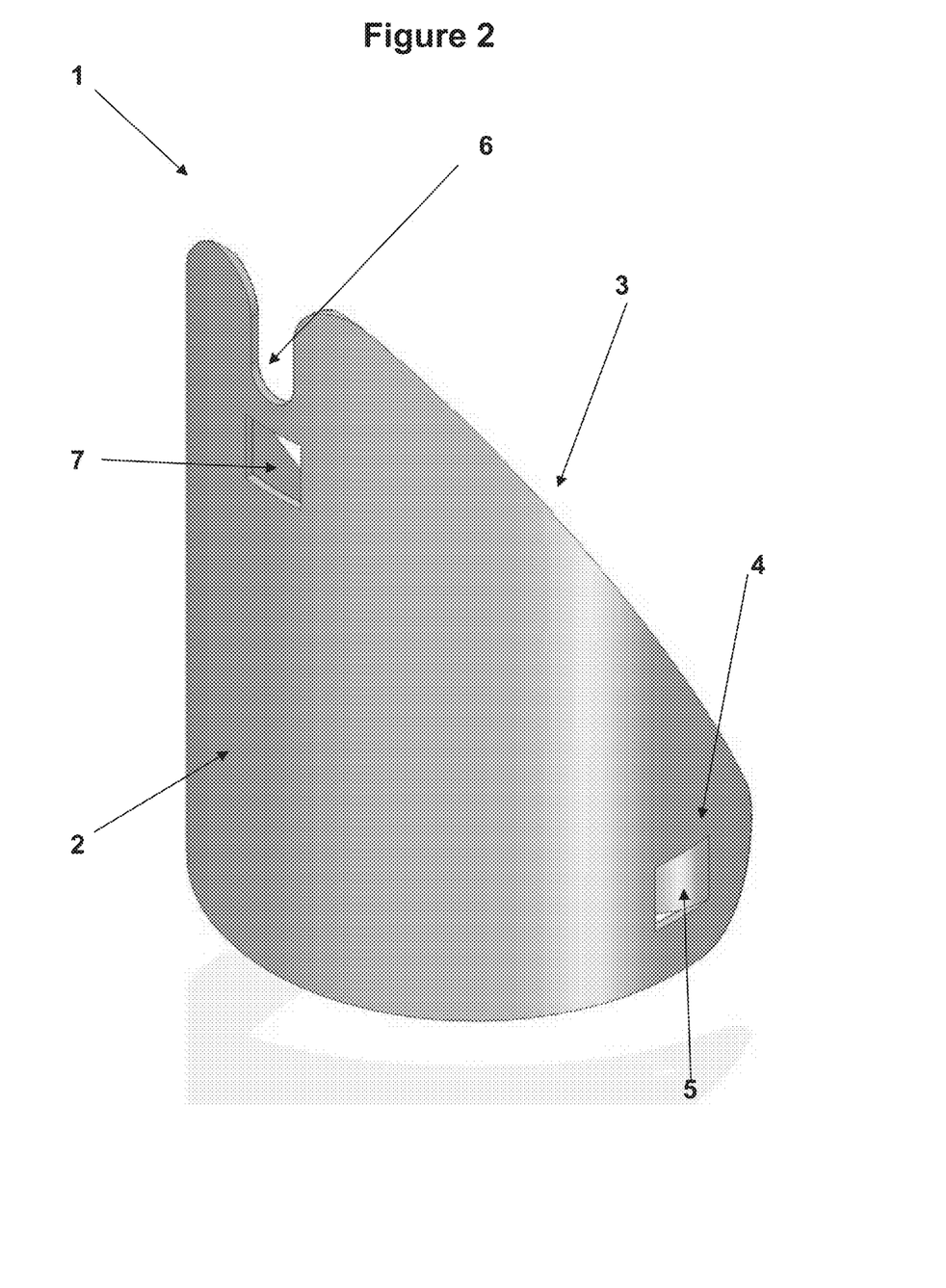
FIG. 2 is an alternative isometric view of the cap.

Referring to FIGS. 1 and 2, the cap 1 of the line connector has an arcuate body 2 and an opening 3. The cap 1 is comprised of resilient connective edges 4, a pair of tabs 5, a recess 6 and an aperture 7. In the embodiment shown the arc of the body of the cap 1 is consistently curved, although in other embodiments it may have straight sides, e.g. H shaped, for posts that have a square or rectangular cross section.

The arcuate shape of the body 2 and the resilience of the edges 4 assist in holding the cap 1 to the post (not shown in FIGS. 1 and 2). The tabs 5 are indented into the opening 3. In the preferred embodiment the recess 6 is approximately 15 mm deep and 7 mm wide. The aperture 7 is substantially square and is approximately 8×8 mm.

The cap 1 is approximately 95 mm high and 60 mm wide and is preferably made of steel, but may be made of other suitable materials.

Figure 3:
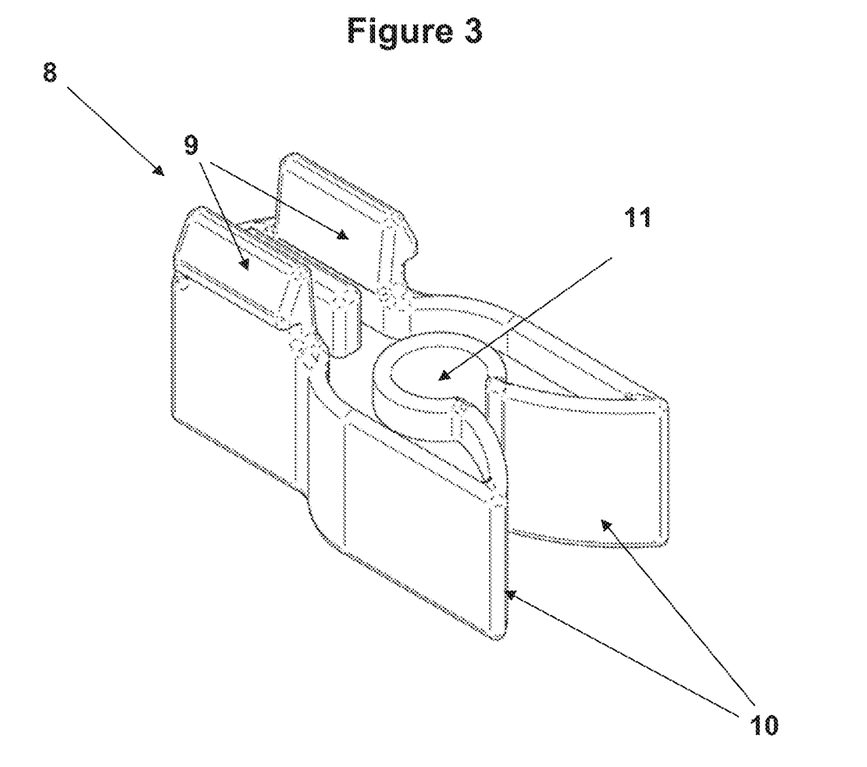
FIG. 3 is an isometric view of a clip that forms part of the connector.
Figure 4:
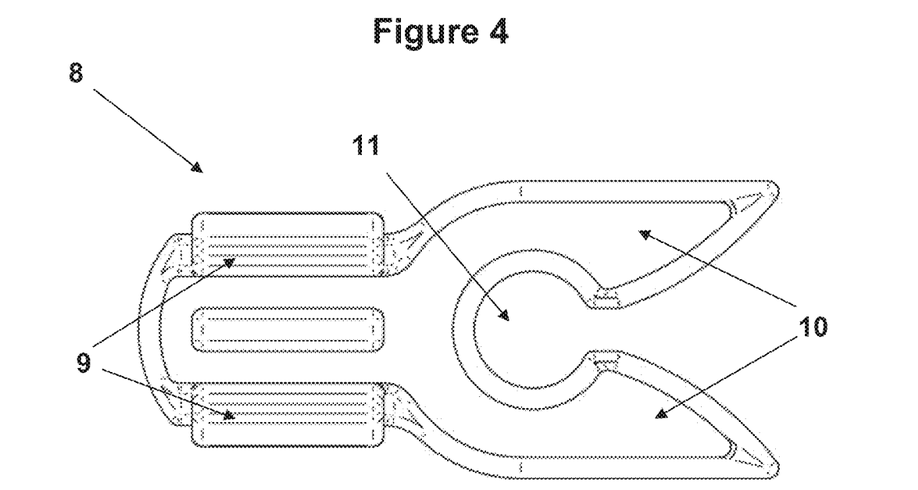
FIG. 4 is a front view of the clip.

Referring to FIGS. 3 and 4, the clip 8 comprises a pair of resilient fixing legs 9, and a pair of resilient line engaging arms 10, which extend substantially at right angles to each other from the body of the clip 8. The arms 10 are shaped to define a line-receiving channel 11. In the preferred embodiment the clip 8 is approximately 30 mm in height and between about 8 mm to 15 mm in width. The clip 8 is preferably made of plastic but may be made of other suitable materials.

Figure 5:
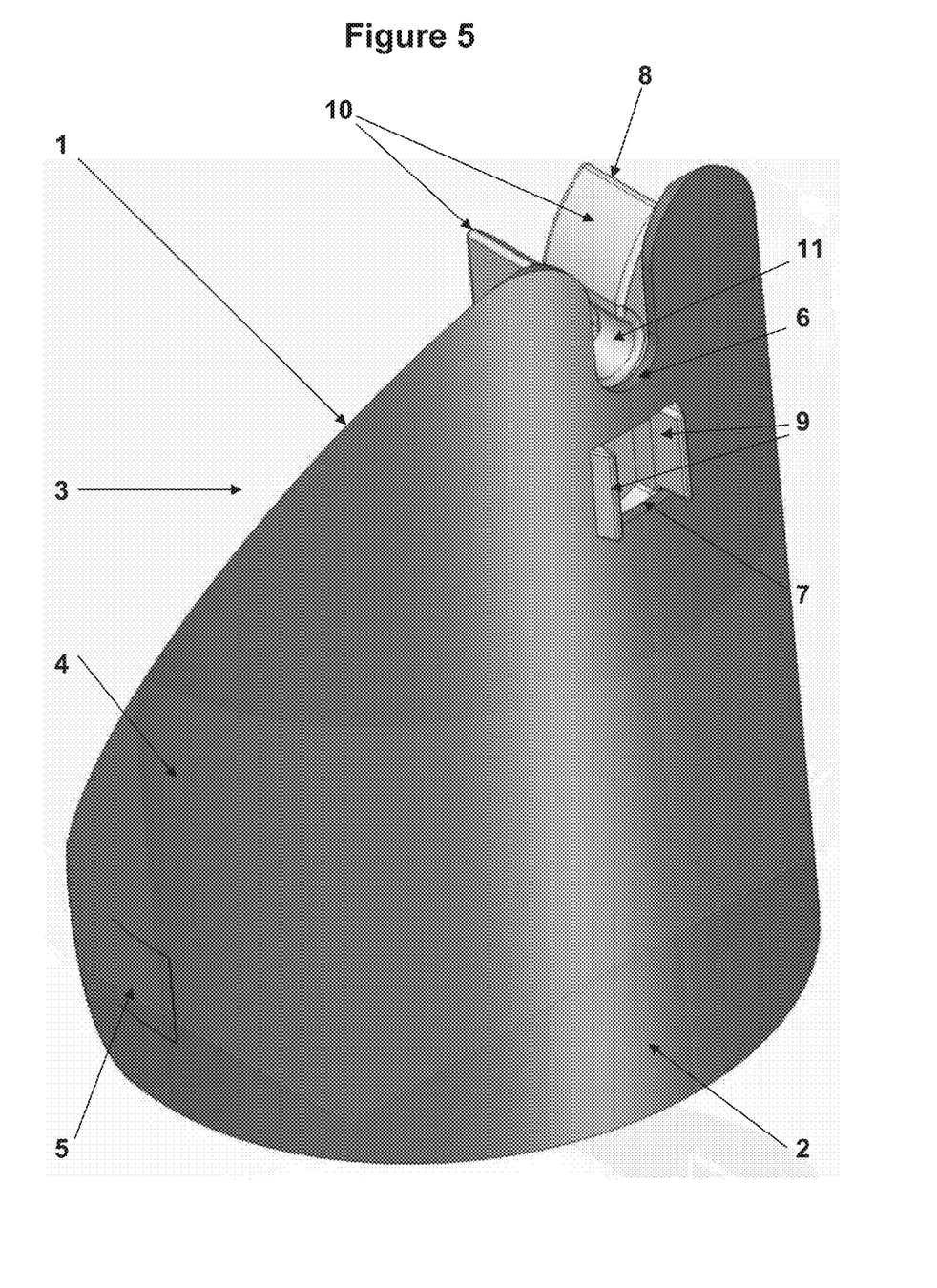
FIG. 5 is an isometric view of the line connector incorporating the cap and the clip.
Figure 6:
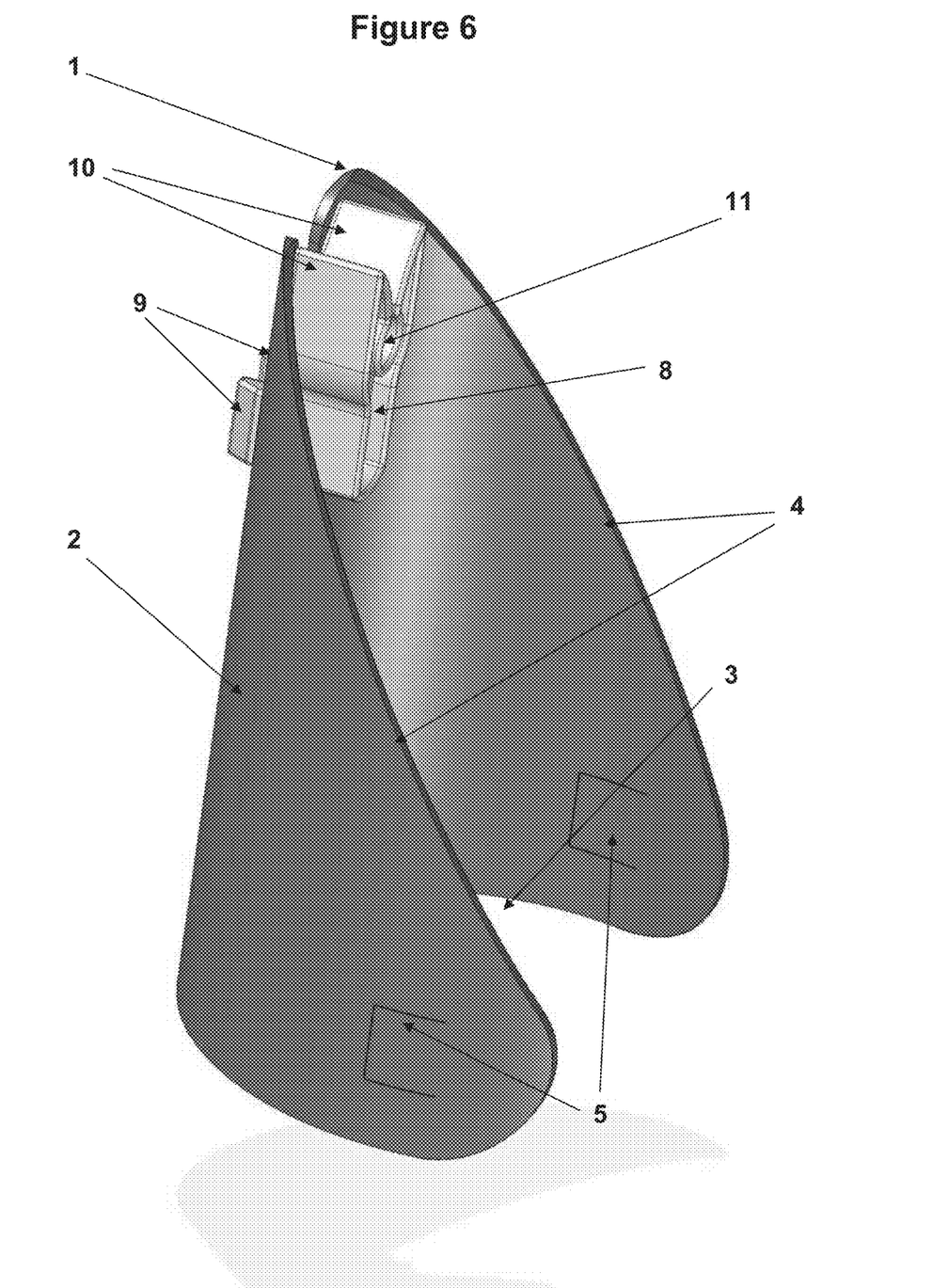
FIG. 6 is an alternative isometric view of the line connector.

Referring to FIGS. 5 and 6, in preparation for use the clip 8 is attached to the cap 1 by manually pushing the legs 9 into the aperture 7 so that the clip 8 is held there in a snug fit, facilitated by edges of the legs 9 gripping the sides of the aperture 7. Once the clip 8 and cap 1 are attached in this way, the channel 11 is aligned with the recess 6.

Figure 7:
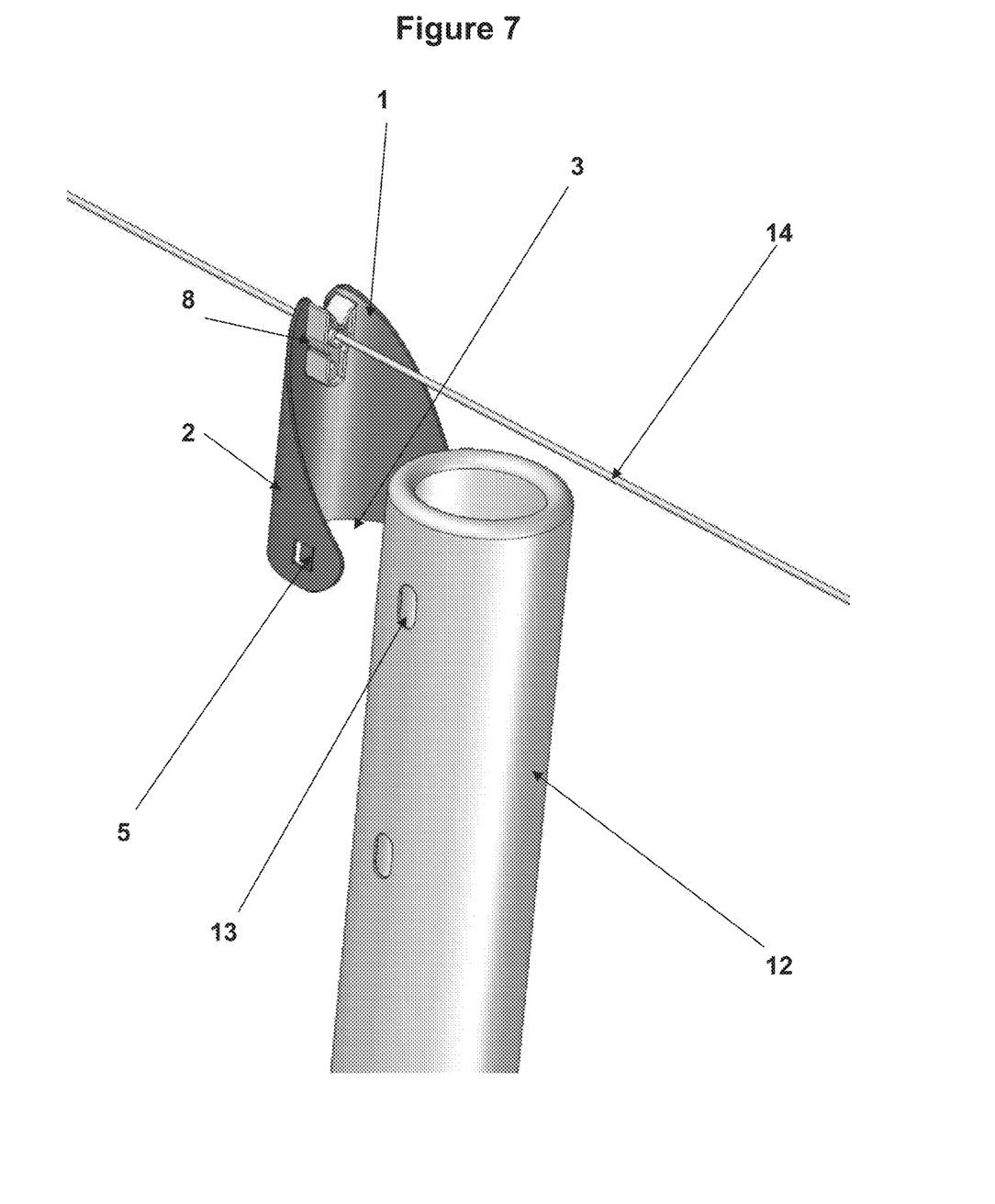
FIG. 7 is a partially exploded isometric view of a post, the line connector and a line.
Figure 8:
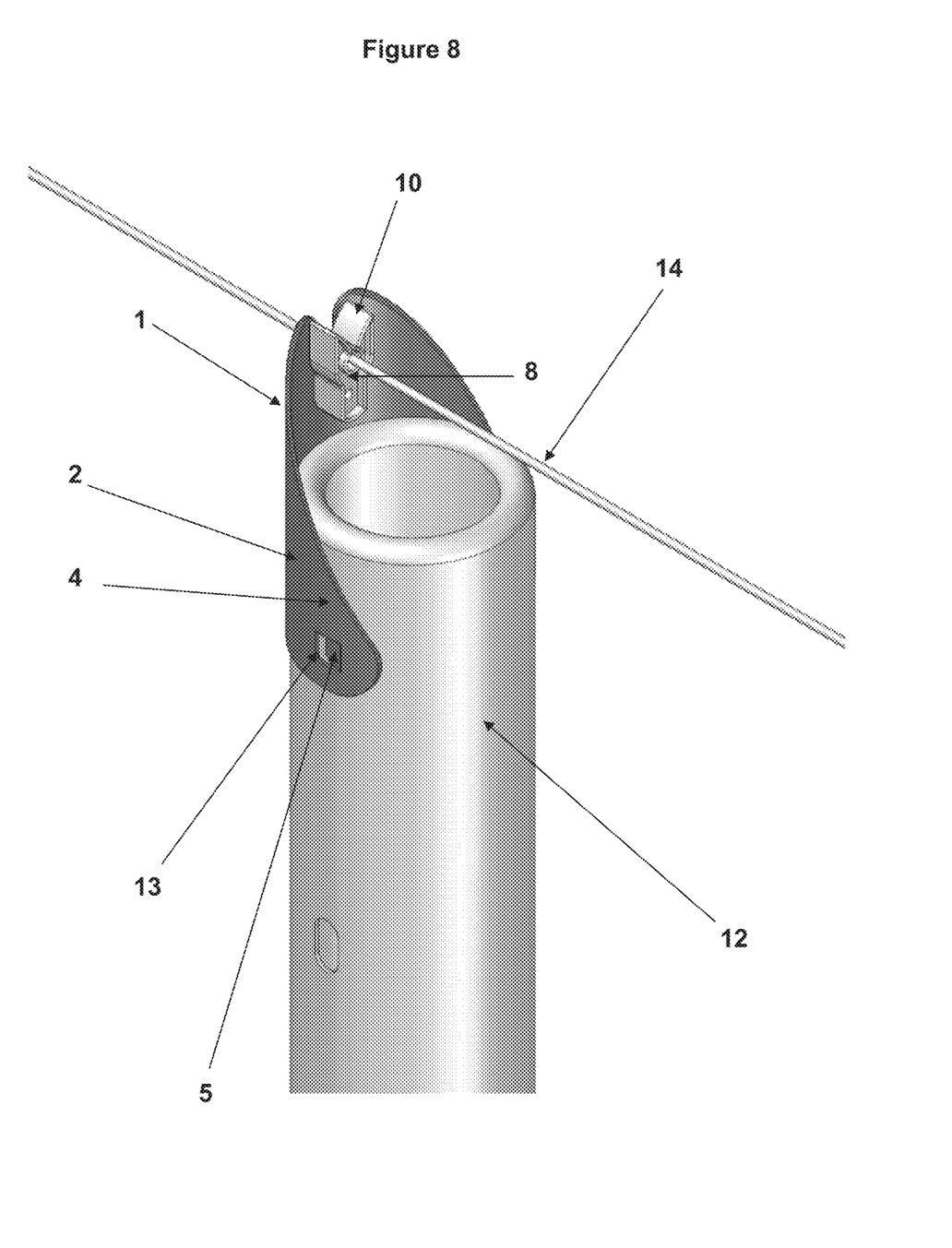
FIG. 8 is an isometric view of the post in combination with the line connector and the line.

Referring to FIGS. 7 and 8 the post 12 has a plurality of slots 13 positioned on opposite sides of the post 12. To assemble the post 12 with the connector (in this case the connector is the cap 1 plus the clip 8) the connector is manually pushed around the upper part of the post 12. The arcuate shape of the cap 1 engages in a snug fit with the post 12, and the indented tabs 5 engage with the slots 13. Alternatively the cap 1 may be pushed around the post 12 and the clip 8 subsequently attached.

Figure 9:
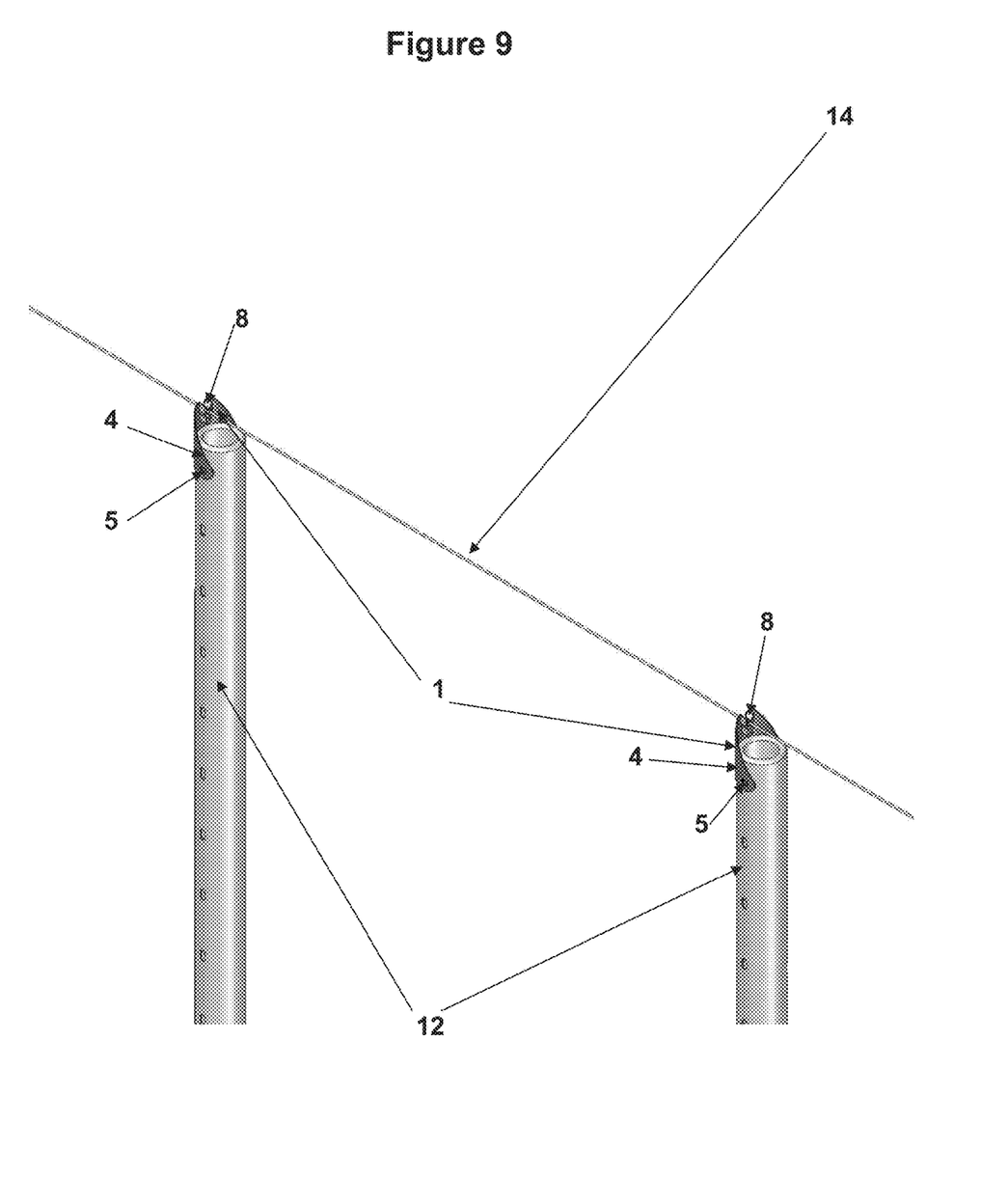
FIG. 9 is an isometric view of two posts in combination with two of the line connectors supporting the line.

Referring to FIG. 9, a plurality of posts 12, each having a connector, is installed in a row in an agricultural setting, for example a vineyard. The line 14, for example a vine-supporting wire 14, is positioned along the row of posts 12 by placing it between the clip arms 10 so that is held in an elevated disposition in the channel 11 of each clip 8.

Once the row of posts 12 is installed as described, a vines is planted at the base of each post and trained to grow up along the post, and then horizontally along the wire 14. The vines may merge along the wire 14.

The parts of the vines running horizontally along the wire 14 are pruned along the top, bottom and sides, creating a box like shape. These vines get thicker the more they are pruned. An issue with this is that the vines can become diseased over time. To deal with this, it is desirable that the vines growing horizontally are periodically severed from the parts of the vines growing up the posts and removed completely, ideally after four seasons, so that new shoots can be horizontally trained along each wire 14. If the wire 14 can be separated from the post 12, the removal of the horizontally growing parts of the vines can be done more efficiently.

However in some known methods of grape growing, a vine-supporting wire either passes through the posts themselves, or is secured to the posts by wrapping a length of wire around the vine-supporting wire and each post. It is therefore not practical to separate the vine-supporting wire from the posts when pruning as each length of wire wrapped around each vine-supporting wire and post would have to removed manually which is time consuming and difficult.

In the preferred embodiment of the invention, it is possible to more easily remove the wire 14 from the posts 12 to strip the wire 14 of horizontal vines. In this regard the wire can be readily pulled free from the clips 8, preferably mechanically but optionally by hand, by exerting a force that overcomes the retaining resilience of the clip's arms 10.

Once the horizontal vine growth on the wire 14 has been removed, the wire 14 can be manually or mechanically returned into the respective clips 8. This involves pressing or pulling the wire 14 between the clips, mechanically or by hand, so that they open to admit the wire 14 and then close to secure it.

New shoots from the main vertical vine are then trained to grow along the wire 14 for a new season of growth.

In terms of disclosure, this document hereby discloses each item, feature or step mentioned herein in combination with one or more of any of the other items, features or steps disclosed herein, in each case regardless of whether the combination is claimed.

While some preferred embodiments of the invention have been described by way of example it should be appreciated that modifications and improvements can occur without departing from the scope of the following claims.

What is claimed is:

1. A post in combination with a line connector, the connector having an arcuate body, an opening into the body, resilient connective edges and line holder means, the line holder means comprises a recess in the connector in combination with a line clip, the line clip has a pair of fixing legs and a pair of resilient line engaging arms, the combination being such that:
   an upper part of the post is within the opening;
   the resilience of the edges assists in holding the connector securely against the post;
   the fixing legs engage an aperture in the arcuate body and the aperture is adjacent to but separate from the recess; and
   a line passes between and is retained by the resilient line engaging arms so that the line is releasably engaged by the line holder means and held in an elevated disposition.

2. A post in combination with a line connector according to claim 1, wherein the fixing legs are held in the arcuate body by way of their resilience.

3. A post in combination with a line connector according to claim 1, wherein the line passes through both the recess in the arcuate body and the line engaging arms.

4. A post in combination with a line connector according to claim 1, wherein the connector has at least one tab which extends into a complimentary slot in the side of the post to facilitate securement of the connector to the post.

5. A post in combination with a line connector according to claim 1, having at least two tabs each of which extends into a respective complimentary slot in the side of the post to facilitate securement of the connector to the post.

6. A line connector for use in engaging a line with a post, the connector comprising:
   an arcuate body having:
      an opening into the body for receiving the post;
      resilient connective edges;
      an upwardly-opening line receiving recess; and
      a clip receiving aperture and separate from below the recess; and
   a clip that:
      has resilient fixing legs adapted to securely engage in the clip receiving aperture by way of their resilience; and
      has resilient line engaging arms that are aligned, or adapted to align, with the recess of the arcuate body such that a line can pass through the recess and between the arms while being held by the resilience of those arms.

7. A line connector according to claim 6, wherein the connective edges of the arcuate body each have a tab which extends, or is adapted to extend, into the opening for engagement with complimentary slots in a post.

8. A line connector according to claim 6, wherein the fixing legs extend substantially at right angles with respect to the line engaging arms.

* * * * *